May 31, 1955   J. EAGERMAN   2,709,412
AUTOMATIC BAKING OVEN

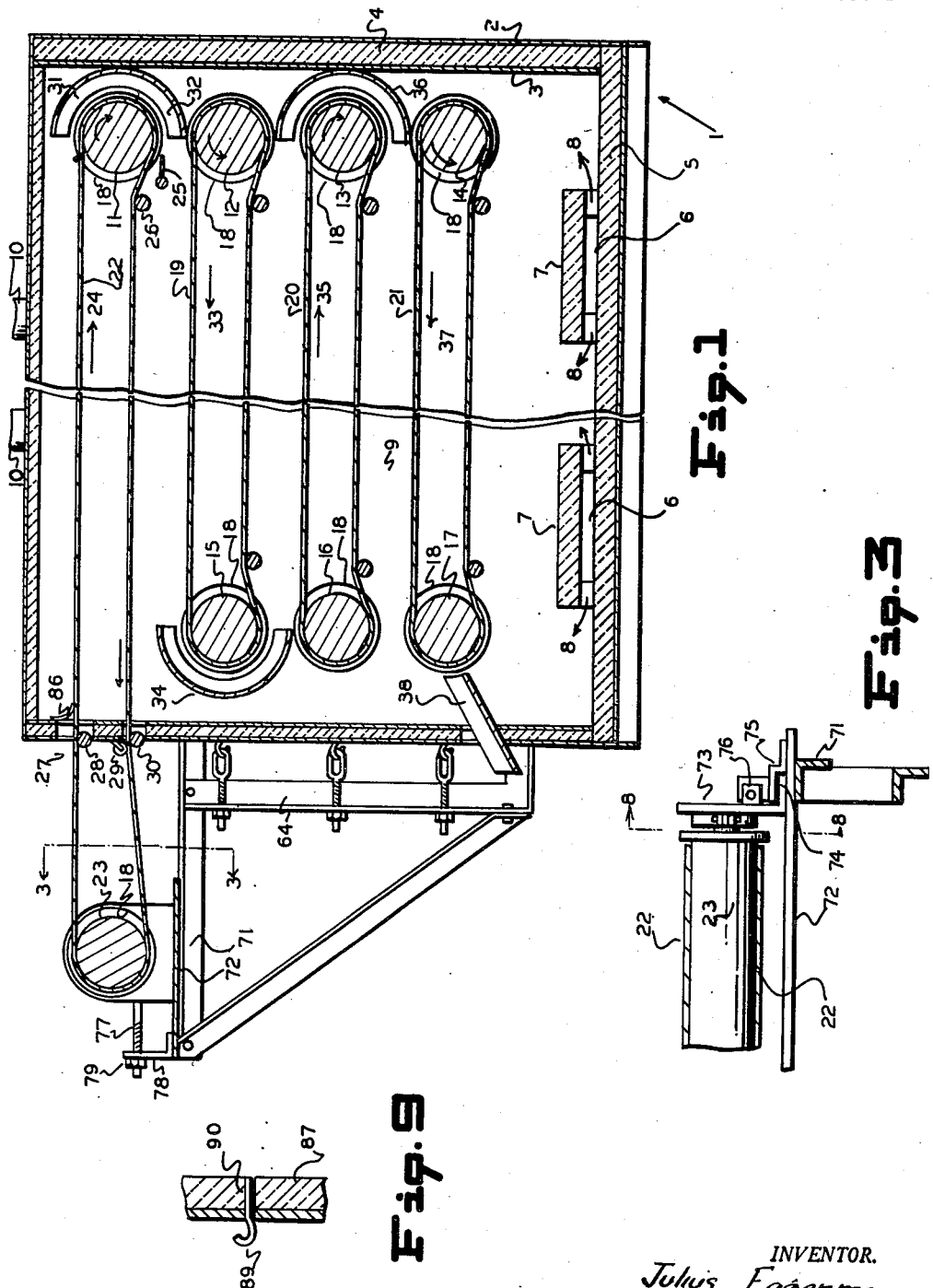

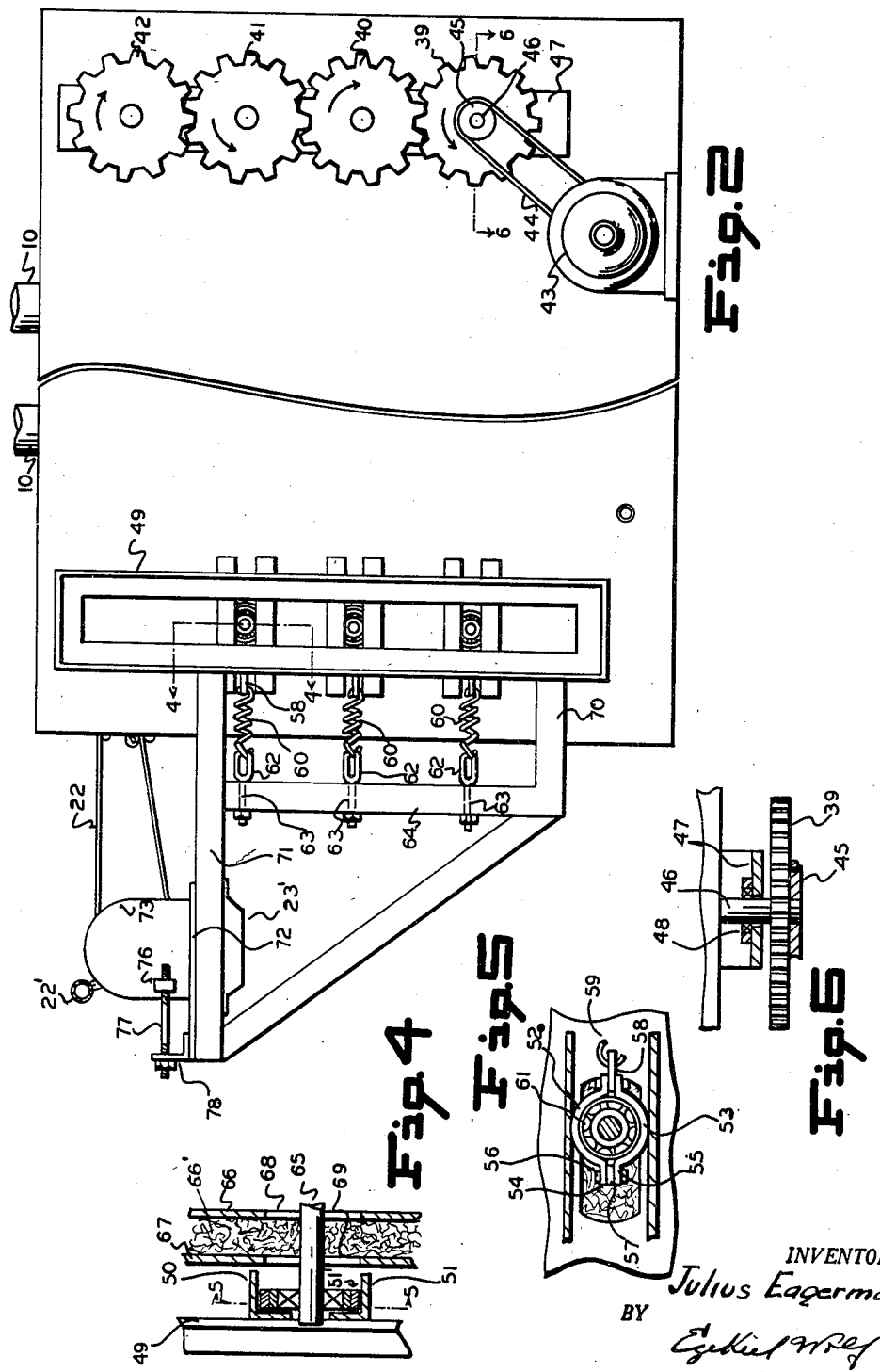

Filed Feb. 25, 1950.   4 Sheets-Sheet 3

INVENTOR.
Julius Eagerman
BY

May 31, 1955
J. EAGERMAN
2,709,412
AUTOMATIC BAKING OVEN
Filed Feb. 25, 1950
4 Sheets-Sheet 4
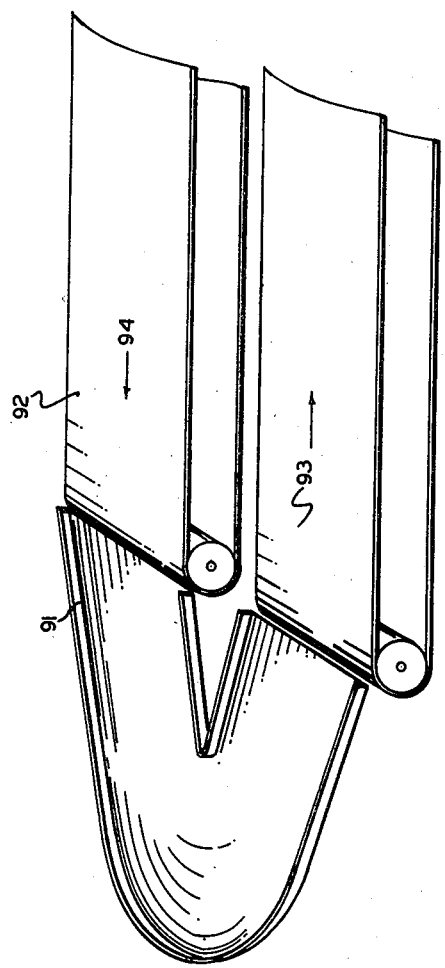
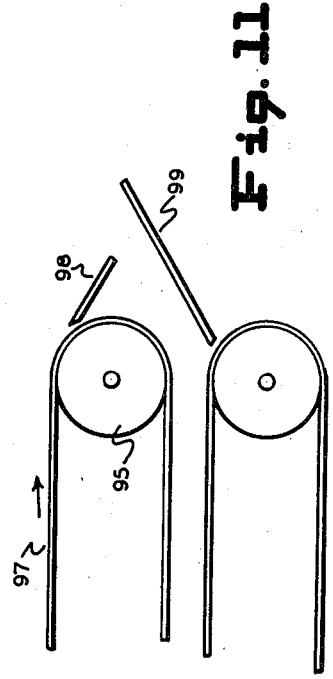
INVENTOR.
Julius Eagerman
BY

United States Patent Office 2,709,412
Patented May 31, 1955

2,709,412

AUTOMATIC BAKING OVEN

Julius Eagerman, North Quincy, Mass.

Application February 25, 1950, Serial No. 146,261

3 Claims. (Cl. 107—57)

The present invention relates to a machine for baking bread, rolls and the like and more particularly for baking baigels which are made of bread dough formed in the shape of doughnuts, first boiled for a short time and then baked in an oven at comparatively high baking temperatures.

The method usually employed is to use an ordinary baking oven heated by gas, coal, coke, oil or the like in which the boiled formed baigels are placed on a long flat spatula which is also used for putting the baigels in the oven, removing them and also manipulating and turning them in the oven.

The method of baking usually employed is to wet the long board or spatula with water upon which the baigels are placed, then line the baigels up on the board and put the board with the baigels on it into the oven where they remain for a short period of time. The board with the baigels on is then drawn out of the oven and a string passed under the baigels to free them from the board in event that they happen to stick, after which the operator puts the board back into the oven with the baigels on it and dumps the baigels off of the board in such a way that the top baked surface lies on the oven floor. This system is employed to prevent the baigels from sticking to the oven floor. The baigels in their turned position are then allowed to bake on the top side which has not been exposed directly to the heat. There may be several further operations required, as for instance turning the baigels over again once or twice which is done with the same board or spatula or moving the baigels from a hotter place in the oven to a cooler place. All this requires considerable skill on the part of the operator as the board may be quite long and heavy anywhere from about 8 to 12 feet in length and further considerable open space behind the oven is required in order to wield and turn these long boards. Further the baking operation needs a skilled operator.

In the present invention these difficulties are avoided. The baigels are automatically fed on to an endless belt from the front of the oven through an opening or port into and through a part of the oven where the heat is comparatively great for baking the baigels the necessary short quick time on their top surface, after which they are stripped and turned and baked on the other side, and finally, after an appropriate baking period under temperatures which may be cooler in the final parts of the oven where the baking occurs, the baigels are delivered through a chute to the outside ready for packing and shipping.

While the present invention may, as will appear from the specification below, be also used for the purpose of baking rolls, such as Vienna rolls or small bread loaves, the invention finds great utility in the baking of baigels which are a particular species of bread as pointed out above.

The invention will be more fully described in the specification below when taken in connection with the drawings illustrating an embodiment thereof in which:

Figure 1 shows a longitudinal broken sectional elevation through the machine.

Figure 2 shows an elevation of the machine as viewed from the right side of the machine when the right end of Figure 1 is considered the front thereof.

Figure 3 shows a sectional view taken on the line 3—3 of Figure 1.

Figure 4 shows a section taken on the line 4—4 of Figure 2.

Figure 5 shows a section taken on the line 5—5 of Figure 4.

Figure 6 shows a section taken on the line 6—6 of Figure 2.

Figure 9 shows a section taken on the line 9—9 of Figure 7, and

Figures 10 and 11 show modified forms of the device for delivering the goods from the upper to the lower conveyor and are respectively fragmentary perspective and front elevation views of the same.

Figure 7:
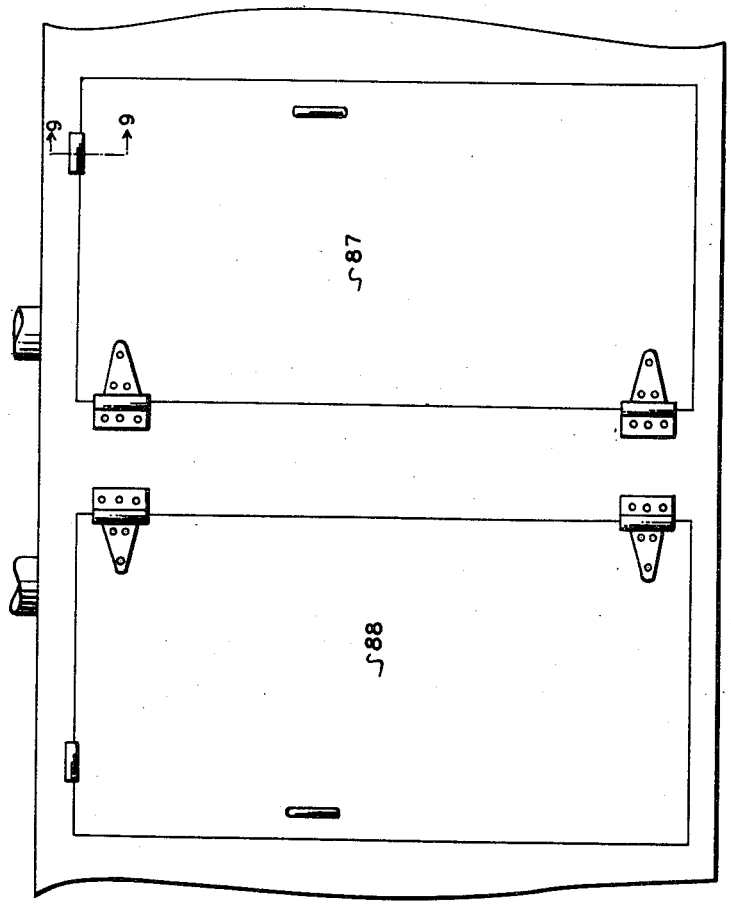
Figure 7 shows a fragmentary side view of a portion of the left side of the machine as referred to in Figure 1.
Figure 8:
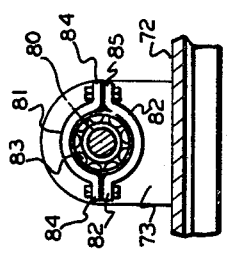
Figure 8 shows a section taken on the line 8—8 of Figure 3.

In the arrangement indicated in Figures 1 to 9 inclusive, the device shown comprises a heat insulated oven or housing having walls 1 which may be made of iron or metal plating or sheeting 2 and 3 spaced from each other and insulated with heat insulating material 4 such as fiber glass, asbestos, or the like filling the space. The oven housing may be rectangular in shape with a fire brick floor 5 provided with openings and recesses 6 in which gas or other heating elements may be placed and through which the air which is heated may enter the oven and be carried over the endless belts as will be explained. The openings may be covered by heat fire brick platforms 7, 7, which may serve as heat radiating elements and may also spread the heat flow around the side passages as indicated by the arrows 8, 8 etc. The plates 7 are supported on corner posts for this purpose so as to provide a flow passage for the hot air around all sides of the plates. The hot air rising in the interior 9 of the oven may be conducted outwards through flue pipes 10, 10 on the top. These flue pipes may of course be controlled by stack valves or any other known method to control the flow of the hot air. A forced or natural draft may be used. Where there is sufficient opportunity of a chimney, this will usually suffice.

In the oven as just described, the hottest section is the top section where the dough to be baked is first introduced. In the oven space there are mounted a series of parallel transverse rolls 12, 13 and 14 at one end of the oven and 15, 16 and 17 at the other end of the oven. These rolls may be provided with end flanges 18. The rolls themselves support in pairs a series of parallel endless belts. The rolls 12 and 15 support the belt 19, the rolls 13 and 16, the belt 20, and 14 and 17, the belt 21. The top belt 22 is supported on the inside by the roll 11 and at the other end by an external roll 23 which also may be provided at its ends with flanges 18. These endless belts may be made of hardware cloth, as for instance of copper or a Phosphor bronze screening or some other suitable metal which will withstand the heat of the oven without substantial warping or sagging. They may also be covered with a fabric asbestos or some other suitable covering over the hardware cloth. The oven on the inside may at the top run with a temperature as high as 600° to 800° F., and it is therefore desirous to have a metal which will not expand to a great extent at this temperature. The drive for all of the belts is obtained at the rear end of the machine, considering the forward end, the feed end. The rolls are supported by shafts or axles which are mounted externally of the oven in bearings such as ball or roller bearings and properly lubricated providing a smooth running system which can be lubricated in the simplest manner. The mountings of the supporting rolls and driving system will be explained later.

Each of the endless belts are made taut after they are put on the rolls by moving one of the rolls apart from its opposing rolls as will also be presently explained. The endless belt 22 moves in the direction of the arrow 24, about the roll 11 on the lower outside of which is a stripping wire or plate 25 and a small guide rod 26 to hold the belt close to the roll. On the forward end of the belt 24 at the upper inlet opening 27 is a small supporting roll 28 and on the lower outlet end of the belt are two press rolls 29 and 30. These smaller rolls may be mounted to turn or be fixed without turning in which case the belt is in light frictional contact with the rods or rolls. As the baigels, rolls or bread are carried across the top of the oven to the rear end of the belt 22, it passes within the chute or arched channel 31 which may be substantially semicircular and attached to the inner back wall 3 of the oven. This channel which is as long as the belt is wide, maintains the bread, rolls or baigels substantially in their same relative position with respect to the center of the roll so that when it emerges from the lower end of the chute at a point 32, the roll will be turned over as it is received on the next lower belt 19. The baigels will then be travelling in the direction of the arrow 33 and when it comes to the forward end of the oven, it will again be turned by means of the chute 34 which is similar to the chute 32. On the next lower belt 20, the baigels will travel in the direction of the arrow 35 and be turned over by the chute 36 from which it will be deposited on to the final belt moving in the direction of the arrow 37 and ejected through the outlet chute 38. The rolls 11, 12, 13 and 14 will therefore rotate in alternate directions.

These rolls are driven on the outside by means of similar and equally spaced gears 39, 40, 41 and 42. The gear 39 is driven through a variable speed motor 43 which may be manually controlled, driving a belt 44 and through the belt a pulley 45 which is attached to the gear 39. A section through the driving gear 39 is shown in Figure 6. The roll 14 is mounted coaxially on a shaft 46 which extends through the oven wall which comprises parallel plates 66 and 67 with heat insulating material 66' filling a space between the walls. This shaft 46 is journalled in brackets 47 which extend on the outside from the top to the bottom of the oven and journal all of the other rolls and driving gears. The brackets 47 may be fastened to the outside wall of the oven in any suitable manner as by welding or by bolting the brackets to the outside wall plates 67. The shaft 46 has a bearing mounted as indicated diagrammatically at 48 which mounting is attached to the bracket 47. The shaft 46 extends beyond the bracket and carries the gear 39 and the driven pulley 45 all fixed together. The spur gear and pulley may be secured to the shaft 46 in any suitable way as by a forced fit or by means of a key and key-way or in any other suitable manner. The mountings of the four rolls described are in fixed bearings on both sides of the housing at the rear end. At the forward end the rolls are mounted for adjustment so as to permit tightening, removal and change of the belts when desired. These mountings are shown more in detail in Figures 2, 4 and 5, while mounting of the roll 23 is shown more in detail in Figures 1, 3 and 8. The mountings of the rolls 15, 16 and 17 and 23 are similar at both ends so that only one end will be described.

Mounted on the outside of the oven and spaced therefrom by suitable angle brackets, not shown, is a mounting frame work 49, which as indicated in Figure 2 is formed of an L angle element with one side lying in the plane of the frame which is parallel to the side wall of the oven and the other side extending outward perpendicular to it. Welded or attached to this frame at the correct spacings are horizontal L channel elements 50 and 51, forming sliding supporting bearings for the shaft housings. These L channels have one face attached to the frame 49 and the other face or side extending inwardly perpendicular to the frame. Within these slide bearings the bearing housing assemblies 51' slide. The bearing 51' as indicated in Figures 4 and 5 comprises two half ring elements 52 and 53 which have diametrically opposite extending ears 54 and 55 respectively through which a joining bolt 56 passes suitably capped to retain two halves of the ring elements together. The ears of the ring elements are spaced by means of a spacer 57 on one end and on the other end this spacer comprises a chain link 58 to which the hook 59 formed at the end of the spring 60 is attached. Within the ring formed by the ring halves 52 and 53 is the ball bearing assembly 61. The springs 60 at their other end are held by the eye bolts 62 which have long shanks 63 supported in an L section bracket 64 which is suitably attached to the wall of the oven or to some frame work on the oven. By taking up on the bolts 63, the complete bearing assembly is pulled forward so that the belts in the oven may be properly tensioned. In order to permit the shafts 65 which carry the forward rolls 15, 16 and 17, to be moved through the walls of the oven, the side plates of the oven 66 and 67 have suitable holes 68 and 69 which may be a matter of two or three inches long or of sufficient length to permit the necessary take up on the belts within the oven.

The L channel 64 against which the shafts carrying the rolls 15, 16 and 17 are tensioned may be supported at the lower end from a bracket 70 attached to the frame and at the upper end from a forwardly extending beam 71 upon which the roll 23 and its supporting shaft is mounted. Mounted on the beams 71 is a cross plate 72 which carries an upwardly extending bracket mounting 73 having a right angle flange 74 at the base which is mounted for sliding in a channel formed by a Z sectioned support 75 attached in face-to-face relation with the plate 72. The bracket 73 carries a projecting ear 76 which is threaded to receive a rod 77, the other end of which passes through a bracket member 78 mounted on and attached to the supporting plate 72. The stay bolt 77 is capped on the outer side of the plate 78 by nut 79 by means of which the whole bracket 73 may be tensioned the proper amount thereby stretching or tensioning the endless belt 22. The bracket 73 supports the shaft 80 coaxially mounting the roll 23. This is shown more clearly in Figure 8. Two pairs of semi-circular ring bearing elements 81 and 82 hold the ball bearing assemblies 83 for supporting the shaft 80. One of these rings, as for instance 82, is rigidly attached to the bracket 73, while the other half 81 of the support for the bearing is bolted through the ears 84, 84, and corresponding ears 85, 85, formed as a part of the ring 82. By tensioning the rod 77 therefore, the whole bracket assembly at either side may be pulled forward, thereby permitting the proper tensioning to be obtained for the feed belt 22. A screen of soft asbestos fabric or other suitable material may be mounted as indicated at 86 on the inside of the inside of the oven at the inlet side 27. This if desired may be moistened by a stream of moisture directed at it from the outside or in any other suitable way so that the top of the baigels or other dough may slide into the oven without being marred or so that they may be properly moistened as is sometimes desired before putting them in the oven. The feed belt 22 should also be thoroughly wetted when the baigels are placed on it. For this purpose, a sprinkler pipe 22' passes transversely over the top of the belt and beneath the belt there may be a trough 23' to receive the excess water.

A further feature of the oven of the present invention is the arrangement of the door as indicated in Figure 7, which shows two doors 87 and 88 occupying substantially the whole side of the oven, thereby permitting easy access to the entire oven and all of the endless belts therein. These doors close without locks and are simply held by top springs shown more clearly in Figure 9. The curved spring member 89 has one end mounted on the inner face 90 of the door frame with the other end extending outward and curved downward and upward as shown in Figure 9 so that when the door is shut, the spring is first forced upwards and then comes down holding the door in position. This door preferably extends from the very top of the oven down to the floor so that easy access may be had even to the fuel burners at the lower portion of the oven.

In the arrangement indicated in the oven as shown in Figure 1, the rolls or baigels are turned so that the top or exposed portion of the rolls on each succeeding endless belt is the opposite from that on the one above. If it is desired to keep the same face of the roll upward at all times, this may be done by providing a reverse chute as shown in Figure 10, wherein the chute 91 is formed like a rim and extends from an upper belt 92, to a lower belt 93. The bread or rolls riding off the belt 92 in the direction of the arrow 94 enter on the chute 91 and travel down the rim coming to the belt 93 with the same face upwards as they left the belt 94. The rim 91 may be attached to the inside wall of the oven. A still further arrangement as indicated in Figure 11 may be used in which the bread may be carried by the belt 97 over the roll 95 and over a small slide 98 and discharged against an inclined chute 99. This chute is so positioned that as the bread or roll hits it, the rear end of the bread or roll will drop down flush on the chute 99 and slide down the chute. In this way the roll will not be turned upside down, but will maintain its upright position as it slides down the chute 99 to the next endless belt below.

The operation of the device readily follows from the description set forth above, and while the structure has been described with reference to the embodiment shown in the drawings, it may be varied within the scope and spirit of the invention.

Having now described my invention, I claim:

1. A machine for baking baigels, rolls, bread and the like comprising a baking oven having side walls and end walls forming an enclosed baking chamber the end wall at one end having a small inlet opening extending across the same, a conveyor belt having a supporting roll for driving the belt positioned at the top of the rear end of the oven, a forward supporting roll for supporting the other end of the belt positioned forward of the inlet opening for said oven, said conveyor belt being endless and extending around both said rolls with the top section of the belt passing through said inlet opening, a plurality of endless conveyor belts each having a pair of supporting rolls supporting said belts in parallel array with said first mentioned belt, means for journalling all said rolls on the outside of said oven away from contact with the heat of the oven including shafts supporting said rolls extending through holes in the side walls of the oven at both ends thereof, means for driving the shafts at the end away from said inlet in opposite directions one with the next, said top conveyor belt having a substantial section extending forwardly of the oven on which the articles to be baked may be placed for conveying them into the oven and means positioned over said conveyor belt forward of the oven for wetting the top surface of the top conveyor belt before it enters the oven.

2. In a machine for baking baigels, rolls, bread and the like comprising an oven having side walls and end walls forming an enclosed baking chamber, a plurality of endless conveyor belts arranged in parallel relation lengthwise of the oven, a plurality of rolls for supporting said belts in said positions, one set at the rear of the oven and one at the forward end of the oven, means supported externally of said oven for journalling each set of rolls, said journalling means including shafts supporting said rolls extending through holes in the side walls of the oven at both sides of said oven towards the rear end thereof and at the front end thereof, said means supported externally of said oven at the rear thereof, including a pair of brackets at each side of the rear end of the oven spaced away from the wall of the oven, bearing means rigidly mounted on said brackets for supporting the shafts supporting the rear rolls for rotation and a set of intermeshing gears one attached to each of said rear shafts at the bracket on one side only and means for driving one of said gears for driving all of said rear shafts, said means at the front end thereof including a bearing member for each end of said shafts, a bracket for supporting said bearing means for free movement of the same and means attached to said bearing means for tensioning the same in the forward direction of the oven whereby a tension is exerted on the endless belts in contact with their respective supporting rolls.

3. A machine for baking baigels, rolls, bread and the like comprising a baking oven having side walls and end walls forming an enclosed baking chamber, a plurality of endless conveyor belts, a pair of supporting rolls for each such belt at opposite ends of the oven positioning the belts in a parallel array longitudinally of the oven, supporting shafts for said rolls extending through the walls of the oven on both sides, mounting means attached on the outside walls of said oven for journalling said shafts, said mounting means comprising fixed bearing elements for the shafts at one end of the oven and adjustable bearing elements at the other end of the oven, said adjustable elements comprising a pair of spaced angle members, a ring bearing element slidably mounted on said angle member, said ring bearing element being formed of two diametric sections having ears extending therefrom, means bolting said ring sections together, a link secured between said ring sections, and a spring element having one end attached to said link and its other end having attaching means for tensioning said spring and said bearing with respect to the conveyor belt.

References Cited in the file of this patent

UNITED STATES PATENTS

| 447,966 | Mitchell | Mar. 10, 1891 |
| 927,474 | Baker | July 13, 1909 |
| 1,277,125 | Rios | Aug. 27, 1918 |
| 1,280,205 | Garza | Oct. 1, 1918 |
| 1,425,342 | Schaller | Aug. 8, 1922 |
| 1,603,333 | Elliott | Oct. 19, 1926 |
| 1,832,374 | Forby et al. | Nov. 17, 1931 |
| 2,138,465 | Wundrack | Nov. 29, 1938 |
| 2,149,537 | Morton | Mar. 7, 1939 |

FOREIGN PATENTS

| 2,900 | Great Britain | Nov. 28, 1912 |